(12) United States Patent
Zhou et al.

(10) Patent No.: US 8,335,223 B2
(45) Date of Patent: Dec. 18, 2012

(54) HOUSEHOLD GATEWAY SUBSYSTEM AND DIGITAL HOUSEHOLD SYSTEM BASED ON BUS

(75) Inventors: Jianming Zhou, Beijing (CN); Jinglei Liu, Beijing (CN); Congxing Ouyang, Beijing (CN); Han Li, Beijing (CN); Guanghai Zhang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 402 days.

(21) Appl. No.: 12/601,685

(22) PCT Filed: Feb. 29, 2008

(86) PCT No.: PCT/CN2008/070384
§ 371 (c)(1),
(2), (4) Date: Dec. 22, 2009

(87) PCT Pub. No.: WO2008/145030
PCT Pub. Date: Dec. 4, 2008

(65) Prior Publication Data
US 2010/0172362 A1 Jul. 8, 2010

(30) Foreign Application Priority Data
May 25, 2007 (CN) .......................... 2007 1 0099642

(51) Int. Cl.
*H04L 12/28* (2006.01)
(52) U.S. Cl. ..................................................... 370/421
(58) Field of Classification Search .................. 370/254, 370/257, 351, 389, 400–402, 419–423
See application file for complete search history.

(56) References Cited

U.S. PATENT DOCUMENTS

| 2002/0129379 A1* | 9/2002 | Levinson et al. ............. 725/129 |
| 2005/0194909 A1* | 9/2005 | Ooishi ............................. 315/56 |
| 2006/0195900 A1* | 8/2006 | Yeh et al. ........................ 726/15 |
| 2007/0053352 A1* | 3/2007 | Corcoran ...................... 370/389 |

FOREIGN PATENT DOCUMENTS

| CN | 1777057 A | 5/2006 |
| CN | 1848826 A | 10/2006 |
| WO | 0137535 A1 | 5/2001 |

OTHER PUBLICATIONS

International Search Report and Written Opinion as issued in International Application No. PCT/US2008/070384 filed Mar. 24, 2009 to which priority is claimed by the present application.

* cited by examiner

*Primary Examiner* — Omar Ghowrwal
(74) *Attorney, Agent, or Firm* — Workman Nydegger

(57) ABSTRACT

A household gateway subsystem, the subsystem includes: a host device, for connecting an external network with the interior of the household, and controlling various information appliances in the household based on a digital bus; a user operating device, for communicating with the host device via a digital bus interface, and providing various user operating interfaces and control units. A digital household system is also provided, the system includes: a household gateway subsystem, connected with an external communicating network by IP access; the household gateway subsystem includes: a host device; a user operating device, for communicating with the host device via a digital bus interface; a number of wireless signal transceivers, connected with the host device of the household gateway subsystem.

12 Claims, 12 Drawing Sheets

HOUSEHOLD GATEWAY SUBSYSTEM AND DIGITAL HOUSEHOLD SYSTEM BASED ON BUS

FIELD OF THE INVENTION

The present invention relates to a bus-based household gateway subsystem and a digital household system, and particularly to a bus-based household gateway subsystem that is used for information exchange between an external network and an internal network and constituted of a host device and a user operation device. The present invention further relates to a digital household system constructed on the basis of the household gateway subsystem and a wireless signal transceiver within a household.

BACKGROUND OF THE INVENTION

The development of network technologies and information household appliance industry enable the existing separate household appliance devices to be connected via a network, so that information household appliances, which are also referred to as network household appliances, emerge.

A household gateway is necessary for connecting household appliance devices within a household to the Internet, and there are three types of existing household gateway devices, including a set-top box primarily used to enable the control of a television, a computer, and a communication gateway which is adapted for enabling access to the external of the household and networking within the household, but has a low capability of controlling the information household appliance devices.

The existing information household appliance may individually be connected to the Internet via the household gateway, or a plurality of information household appliances may communicate with the Internet via a common household gateway. If a plurality of information household appliances are connected to the household gateway and communication of the household appliances is under the control of the household gateway, a digital household system is formed. The existing household system is mainly based on a Local Area Network, and each household appliance device is equivalent to a small-scale computer. Due to the limitation of IPv4 addresses, IP addresses of devices are generally private addresses, that is, each of the household appliance devices is provided with an IP address, and IP communication between the information household appliance and the external network is conducted through Network Address Translation (NAT) process by the household gateway. However, the NAT process is relatively complex, and the household appliances have a high cost due to the deployment of the Transfer Control Protocol/Internet Protocol (TCP/IP) stack, because each of the household appliances needs to be provided with a processor to conduct the communication.

In view of the above, the existing household gateway and digital household system are disadvantageous as follows.

1) Household appliance devices are difficult to be managed in a uniform way, because various household appliance devices exchange information with the Internet by using separate household gateways in the prior art, for example, a TV set-top box is a gateway device dedicated to a TV but has little capability of controlling and managing other household appliances.

2) In the digital household system in the prior art, a gateway device communicates with an external communication network through the NAT process by the household gateway, and then reaches the information household appliances. Such a LAN communication mode is not necessary for the household system, increases the load of the household appliance devices and gateway device, and is disadvantageous in information security and management.

For example, a control instruction is sent by a user via a mobile User Equipment (UE), if the information household appliance performs strict security authentication on the instruction from the mobile UE, calculation overhead of the information household appliance is increased and the cost is increased. If loose security authentication of the instruction from the mobile UE is performed by the information household appliance, the overhead is saved, however, the security is reduced and there exists possible threaten against the security of the household information.

3) Further, for a household gateway, devices such as a CD driver and a Universal Serial Bus (USB) interface are usually provided merely on a host device of the household gateway, and are inconvenient for the user to operate.

Some household gateways may be provided with external CD drivers and USB interfaces, which increases convenience of user operation. However, special cables, such as USB cables and PCI-E interface cables, are required for the external CD drivers and USB interfaces to connect to the host device. Further, a keyboard and a mouse of the existing household gateway are connected to the host device via either a signal cable (e.g. a USB cable) or a wireless interface (e.g. a Bluetooth or infrared ray interface).

In the case where the signal cable is used to connect the host device, if the device operated by the user (for example, a device connected via a USB interface, a serial port or a parallel port, such as a keyboard, a mouse, a CD driver, a small Liquid Crystal Display screen, a speaker, an earphone microphone socket, a simulation telephone constituted of a simulation hook switch, a simulation telephone handle and a simulation telephone keyboard) is spaced from the host device by a considerable distance, cables between the device operated by the user and the host device of the gateway are difficult to be deployed. For example, if the host device is positioned on the side of a wall on which a television is located, and the device operated by the user is posited around a sofa at the side opposite to the wall, the cables are difficult to be deployed taking beauty and operation convenience into consideration.

Technical teachings of carrying a USB signal using a power line are disclosed in a paper titled "Design of Power Line Carrier Communication Module Based on USB Interface", in which a Power Line Carrier (PLC) communication module based on a USB interface is divided into two parts of a USB signal circuit and a power line carrier modulator and demodulator circuit. In the USB signal circuit, the receiving and decoding of a USB bus serial signal, interpreting of a token ring packet, format checking, and transmission error handling is implemented by hardware of an interface chip, and the power line carrier modulator and demodulator is designed to include an input filter circuit, an output cache circuit, an output filter circuit and an output power amplification circuit, and a coupling circuit is used to decouple a signal from the power line and couple a signal to the power line.

In the case where a wireless interface is used to connect the host device, a relatively high communication rate (above 10 Mbps) is required between the external CD driver or USB interface and the host device, and if a Wireless Local Area Network or Bluetooth is used, there may be wireless interference between the Wireless Local Area Network or Bluetooth and other nearby wireless devices at the same frequency band or an adjacent frequency band, and the data transmission rate and quality may be degrade.

Some external CD drivers and interface devices employing a wireless interface are necessarily provided with batteries, and the standby time and call time thereof may be decreased significantly after the batteries are charged for certain times. The replacement of the battery may increase the cost of the user and increase resource consumption.

SUMMARY OF THE INVENTION

A first object of the present invention is to overcome drawbacks in the prior art, and provide a household gateway subsystem based on digital buses that is primarily constituted of a host device and a user operation device, to separate a network internal to a household from a communication network external the household, so that the security of the household network may be improved, and all information appliance devices in the household network may be managed in a uniform way.

A second object of the present invention is to overcome drawbacks in the prior art, to provide a digital household system primarily constituted of a household gateway subsystem and wireless transceivers, and interfaces based on digital buses are provided for a network internal to the household, so that information household appliances and household devices capable of receiving digital bus signals within the household may be regarded as devices external to the household gateway subsystem, and the network internal to the household is invisible to the network external to the household.

To achieve the above first object, the present invention provides a household gateway subsystem, which includes:

a host device, configured to connect an external network to a household network, and control various information household appliances within the household based on a digital bus mode; and a user operation device, configured to communicate with the host device via a digital bus interface and provided with various interfaces and control units.

To achieve the above second object, the present invention provides a digital gateway system, which includes:

a household gateway subsystem, which is connected to an external network via an IP access network, and is configured to provide various control signals; wherein the household gateway subsystem comprises a host device configured to connect the external network to household devices and control the household devices based on a digital bus mode, and a user operation device communicating with the host device via a digital bus interface and providing various user operation interfaces and control units; and a plurality of wireless signal transceivers, which are connected to the host device of the household gateway subsystem, and is configured to receive and transmit power line carrier signals, receive and transmit wireless signals, and convert the power line carrier signals into the wireless signals or convert the wireless signals into the power line carrier signals.

As can be seen from the above solutions of the invention, the household gateway subsystem and the digital household system based on the household gateway subsystem provided in present invention enables control of various household appliances internal to the household based on the digital buses such as a USB bus mode, and all information household appliances internal to the household are external computer devices of the host module. Therefore, the network internal to the digital household is invisible to the external network, and merely the host device of the household gateway is visible to the external network. Thus, all functions of security and authentication are implemented in the host device. General computing resources are provided on the host device, so that the security of the information household appliances is improved without substantially increasing computing overhead of the information household appliances.

Power lines and power supply sockets are the most widely distributed cable system within the household. With use of the household gateway system of the present invention, the user operation device and the host device may be in communication with each other via the power lines, and wireless interfaces may be also provided so that the user operation device may be in wireless communication using a built-in battery when the user operation device is not connected to the power grid. Therefore, the user may conveniently deploy and operate the household gateway system.

DETAILED DESCRIPTION OF THE EMBODIMENTS

The present invention is described in more detail through the following specific embodiments in connection with the drawings.

An embodiment of the invention provides a household gateway subsystem, which is primarily constituted of a host device and a user operation device, isolates a network within a household from a communication network external to the household, improves security of the household network, and manages all information household appliance devices in the network within the household.

Figure 1:
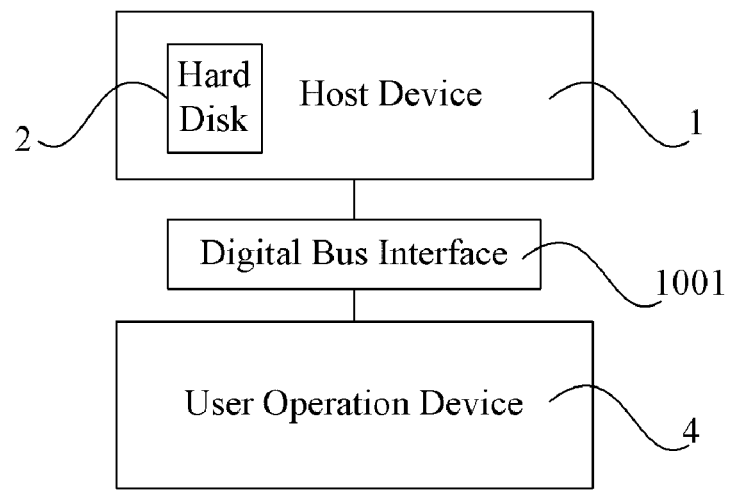
FIG. 1 is a schematic diagram showing the structure of a household gateway subsystem according to a first embodiment of the present invention.

FIG. 1 is a schematic diagram showing the structure of a household gateway subsystem according to a first embodiment of the present invention, and the household gateway subsystem includes: a host device 1, which is provided with a storage medium such as a hard disk 2, configured to connect an external network to a network within the household, and control various information household appliances within the household based on a digital bus mode, such as a USB bus mode and a 1394 bus mode; a user operation device 4, which is configured to communicate with the host device 1 via a digital bus interface 1001 such as a digital bus interface which is a PLC interface over a power line or a wireless interface in a wireless USB mode, and is provided with various interfaces and control units. The household gateway subsystem as shown in FIG. 1 transmits a signal through the PLC, and operates as long as being connected to a power supply socket. When the power supply socket becomes abnormal due to, for example, loose of the power supply socket or disconnection of power supply, the household gateway subsystem may use its backup battery, that is, the host device 1 may be provided with a first battery and power supply module 3, and the user operation device 4 may be provided with a second battery and power supply module 5, and the first battery and power supply module 3 and the second battery and power supply module 5 are connected to a first power line filter and a second power line filter, respectively, and are charged through output voltage of the filters. With the use of both of the backup batteries, the household gateway subsystem may be always in a powered-on state, and abnormal situations may be avoided.

Figure 2:
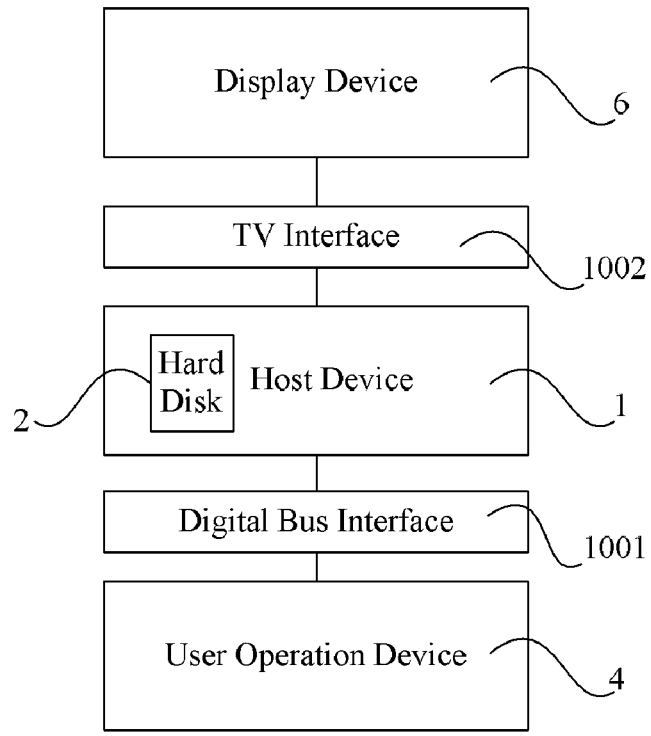
FIG. 2 is a schematic diagram showing the structure of a household gateway subsystem according to a second embodiment of the present invention.

FIG. 2 is a schematic diagram showing a household gateway subsystem based on the structure of the household gateway subsystem as shown in FIG. 1. As shown in FIG. 2, the household gateway subsystem further includes a display device 6 connected to the host device 1 via a TV interface 1002. The display device may be an analog TV or a digital TV, including a digital TV having a function of a computer display. The screen of the TV is used for displaying video information outputted by the host device, and a speaker of the TV is used for play audio information to be outputted by the host device. The TV may act as both an information household appliance and a display device of the household gateway system.

Figure 3:
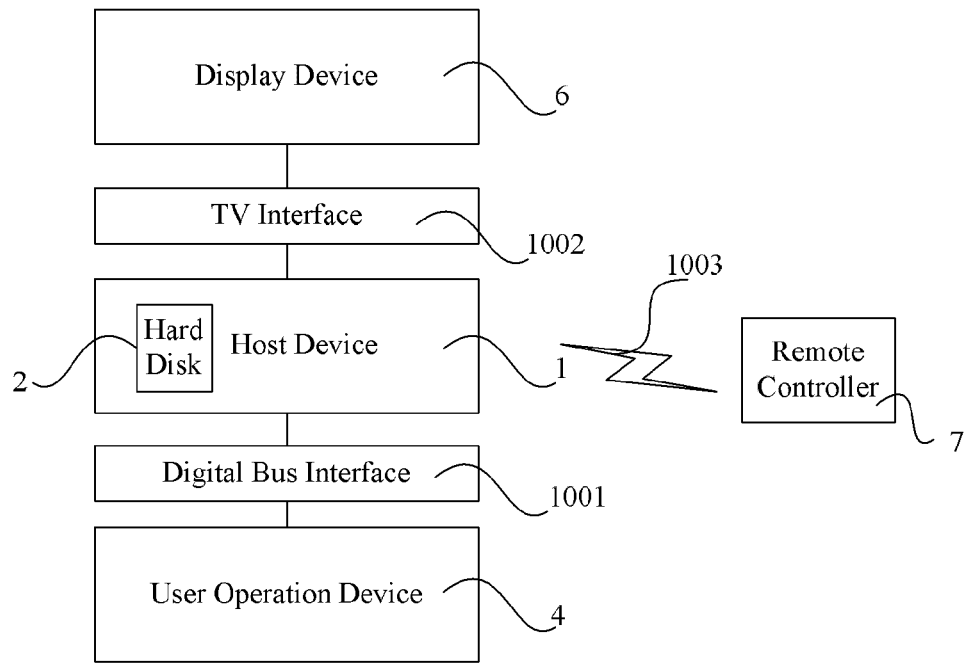
FIG. 3 is a schematic diagram showing the structure of a household gateway subsystem according to a third embodiment of the present invention.

The household gateway subsystem above may further include a remote controller 7, as shown in FIG. 3 illustrating the structure of the household gateway subsystem according to a third embodiment. The remote controller 7 implements data communication with the host device 1 via a wireless interface 1003 within the household, such as a wireless USB interface, a Bluetooth interface and an infrared interface, and functions to control various application subsystems within the digital household through the host device. The remote controller may be provided with thereon some special keys, a color LCD screen and a speaker. For the host device of the household gateway, the remote controller may be regarded as a computer peripheral based on a USB bus. The USB bus signal may be modulated into a wireless signal, which may be a wireless USB signal, to implement the wireless communication between the remote controller and the host device 1.

Figure 4:
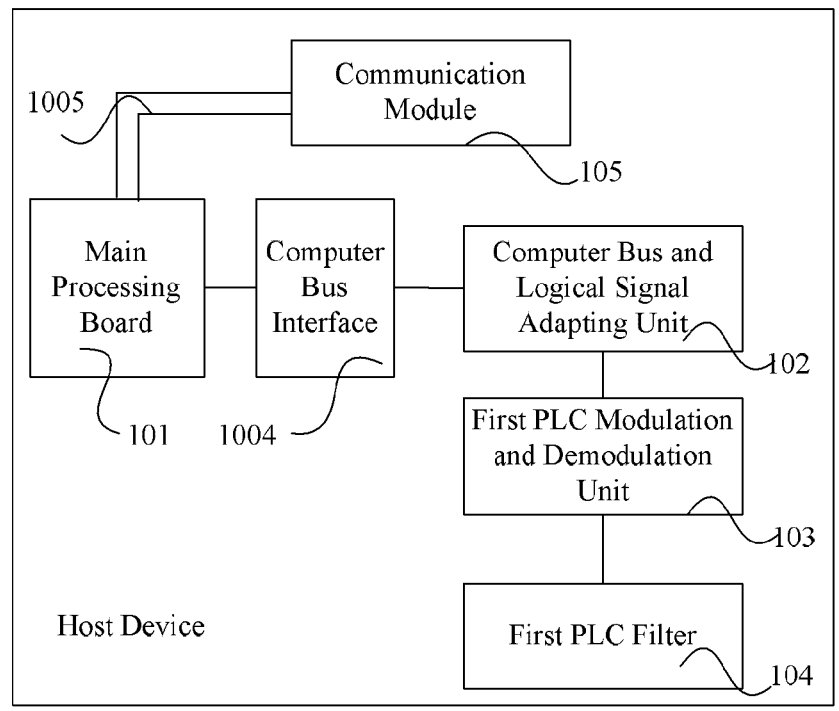
FIG. 4 is a schematic diagram showing a specific structure of a host device in a household gateway subsystem according to an embodiment of the present invention.

A schematic diagram illustrating a specific structure of the host device 1 in a household gateway subsystem is shown in FIG. 4, and the host device 1 may include: a main processing board 101, a computer bus and logical signal adaptation unit 102, a first power line carrier modulation and demodulation unit 103, a first power line carrier filter 104 and a communication module 5. The main processing board 101 is provided with a general CPU, and is used for information processing, control signal generating, and authenticating and authorizing to allocate an address to a household appliance device and provide general computing resources for the digital household. The computer bus and logical signal adaptation unit 102, which is connected to the main processing board 101 via a digital bus interface such as a USB interface and exchanges signals with the first power line carrier modulation and demodulation unit 103, is used for conversion between a logical signal and a digital bus signal such as a USB signal, caching the digital bus signal such as the USB signal after the conversion, sending back the cached signals to the main processing board 101 at a suitable USB bus time period, and decoding the signal. As such, the computer bus and logical signal adaptation unit 102 has the function of conversion between the digital bus signal and a logical signal. For the control of a simple household appliance device, signal decoding may be performed by the computer bus and logical signal adaptation unit 102. The computer bus and logical signal adaptation unit 102 is also a termination of the digital bus signal, all signals fed back by a simple household appliance device may be converted into USB signals, cached in the unit 102 and fed back to the main processing board. The first power line carrier modulation and demodulation unit 103, which is connected to the computer bus and logical signal adaptation unit 102, and is used for converting between a power line carrier signal and a logical signal, and transmitting a control signal. The first power line carrier filter 104, which is connected to the first power line carrier modulation and demodulation unit 103, and is used for filtering and coupling a power signal to output power and a power line carrier signal. The communication module 105, which is connected to the main processing board 101 via a computer bus 1005, and is used for protocol conversion of information, to communicate with an external communication network. The computer bus above may be, for example, a USB bus, a 1394 bus and the like. In a particular embodiment, the computer bus and logical signal adaptation unit 102 adopts the USB bus, resulting in a USB bus signal processing unit.

The communication module 105 between the host device 1 and the external communication network may be designed as a slot card. The slot card of the communication module 105 may be connected to the main processing board 101 via a computer bus (e.g. PCI, PCI-E or USB). The communication between the host device 1 and the external communication network may be based on IP protocol. The physical layer access technologies may include, for example, technologies of wireless (e.g. HSDPA, WiMAX), class-5 lines, optical fiber, CATV, DSL, and PLC based on power line. The designing of the communication module 105 as a slot card aims to improve modularization of the household gateway, improve system maintenance and facilitate upgrade. To establish or change the physical access mode used for the communication between the household network and the external network, hardware configuration requirements may be met by insetting or removing a corresponding communication card to or from the host device.

Figure 5:
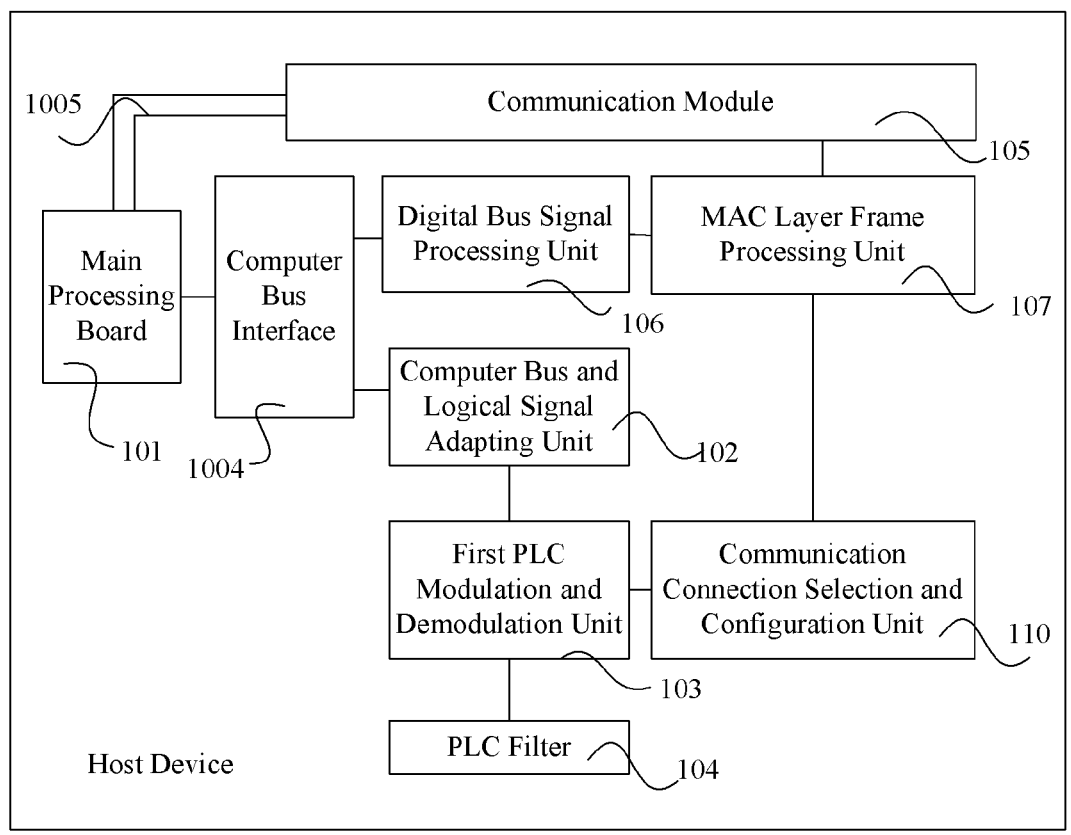
FIG. 5 is a schematic diagram showing a specific structure of a host device in a household gateway subsystem according to another embodiment of the present invention.

FIG. 5 is a schematic diagram showing the structure of a host device in a household gateway subsystem according to another embodiment of the present invention, and the host device may further include a digital bus signal processing unit 106, a MAC layer frame processing unit 107 and a communication connection selection and configuration unit 110. The digital bus signal processing unit 106 is connected to the main processing board 101 via a computer bus interface and is configured to analyze and process contents of digital bus signals, simulate information such as a change on a logical port and a level, associate a logical port with an address, and notify the main processing board about such information. That is, the digital bus signal processing unit 106 functions as a USB hub, obtains information of the logical port and level by software processing, simulate a change of a hub port, and notify the main processing board about the change. The logical port is associated with an address of the household appliance device, caches a USB signal, and sends the USB signal to the main processing board or forward the USB signal downwards during a proper time slot of the USB bus. Particularly, when a downlink port of the digital bus signal processing unit 106 is idle, the digital bus signal processing unit 106 receives a USB signal from the MAC layer frame processing unit, and analyzes the contents of the USB signal; if the USB signal is a powered-on signal, the digital bus signal processing unit 106 simulates and notify information of a port change to the main processing board, and if the USB signal is a general USB signal, the digital bus signal processing unit 106 forward the general USB signal directly to the main processing board for processing. Or, the digital bus signal processing unit 106 may transmit a USB signal from a root hub (which is equivalent to a bus interface) on the main processing board to the MAC layer frame processing unit. The MAC layer frame processing unit 107 is connected to the communication module 105 and the digital bus signal processing unit 106, and is used to distinguish and separate a digital bus signal frame from an Ethernet frame. The communication connection selection and configuration unit 110 is connected to the MAC layer frame processing unit 107 and the first power line carrier modulation and demodulation unit 103, and is used to select adaptively a communication link for the household appliance.

Figure 6:
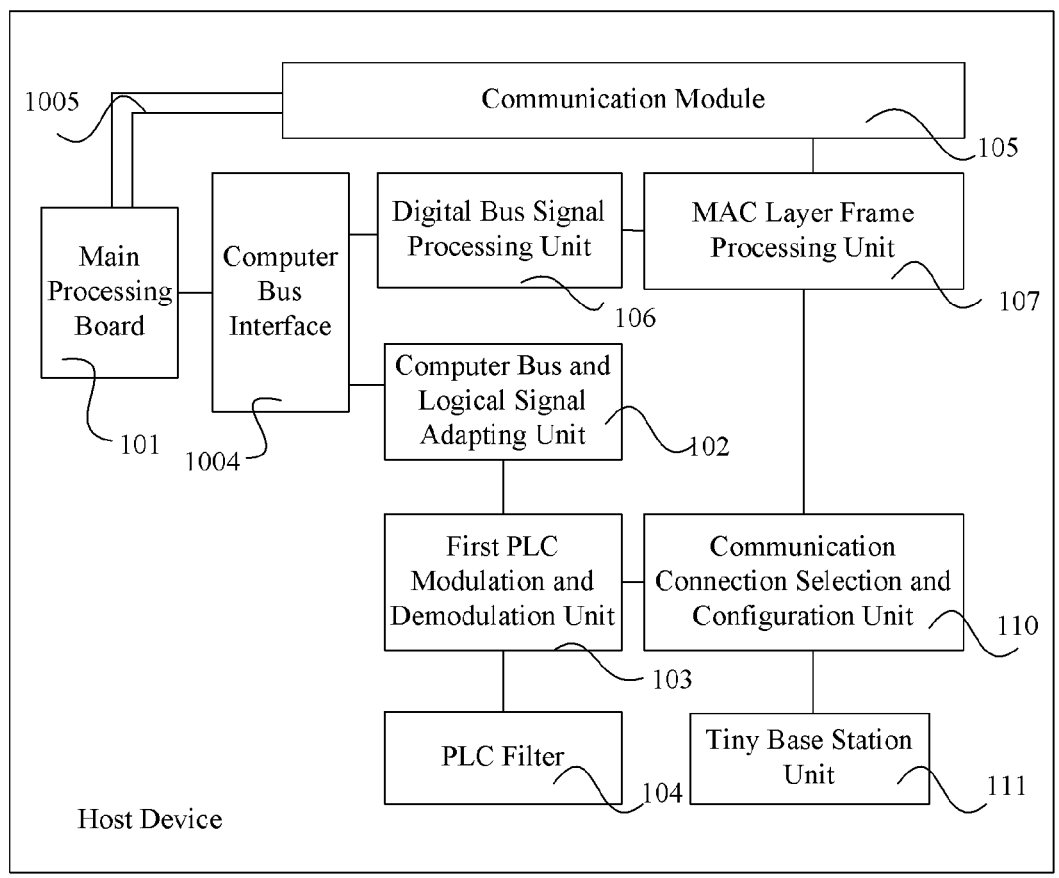
FIG. 6 is a schematic diagram showing a specific structure of a host device in a household gateway subsystem according to still another embodiment of the present invention.

Based on the structure as shown schematically in FIG. 5, a tiny base station unit 111 connected to the communication connection selection and configuration unit 110 may be added, as shown in FIG. 6, and the tiny base station unit 111 may communicate with the household appliances via wireless signals. The tiny base station unit 111 may be an Access Point (AP) for a WLAN network, a wireless USB signal transceiver, or a transceiver of a wireless communication mode of infrared, Bluetooth and the like.

Figure 7:
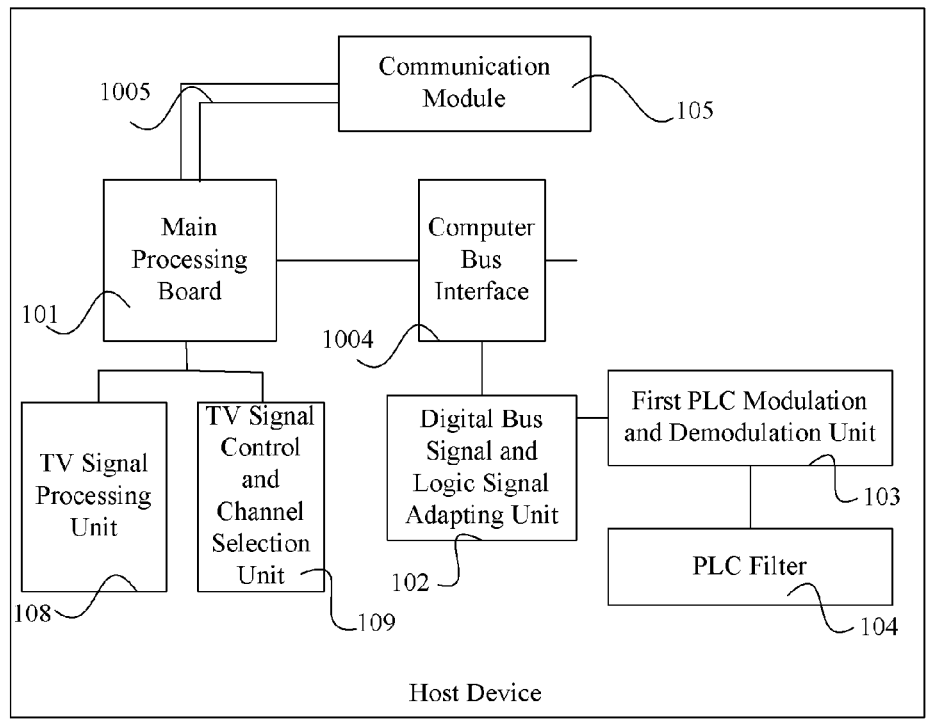
FIG. 7 is a schematic diagram showing a specific structure of a host device in a household gateway subsystem according to still another embodiment of the present invention.

FIG. 7 is a schematic diagram showing the structure of a host device. The host device 1 further includes: a TV signal processing unit 108, which is connected to the main processing board 101, and is used for decoding digital TV signals and converting between an analog TV signal and a digital TV signal; a TV signal control and channel selection unit 109, which is connected to the main processing board 101 and the TV signal processing unit 108, and is used for receiving TV signals, controlling the TV signals and selecting a channel. The main processing board 101 is connected to the TV signal processing unit 108 and the channel selection unit 109 via a computer bus such as a PCI bus, a PCI-E bus and a USB bus.

The TV signal control and channel selection unit 109, TV signal processing unit 108 and main processing board 101 provide collectively a TV signal processing function, which is similar with the function of a set-top box. The combination of the TV signal control and channel selection unit 109, TV signal processing unit 108 and main processing board 101 provides TV signals and enables controlling of the TV set.

Further, VGA display signals and audio output signals from the host device 1 may be adapted for various interfaces by the TV signal processing unit 108 to be suitable for various TV sets, and the interfaces at least include:

1) an S-VIDEO interface, which outputs an S video signal, and may also output an AUDIO AV audio signal with the use of a further provided audio conversion line;

2) a VIDEO interface, which outputs a composite video signal, and may also output an AUDIO AV audio signal with the use of a further provided audio conversion cable;

3) an VGA interface with 15 pins, which outputs an analog RGB signal from a computer graphic card, or outputs a YPbPr High-Definition Component video signal with the use of a further provided component signal-to-VGA cable;

4) an AUDIO AV interface and an AUDIO PC interface, which outputs audio signals; and 5) a TV antenna interface, which simulates and outputs a TV radio frequency signal.

If an analog TV broadcast signal received by the host device 1, the analog TV broadcast signal is inputted to a TV set directly via a CATV cable. If a digital TV broadcast signal is received by the host device 1, the digital TV broadcast signal is inputted to a TV set directly if the TV set is a digital TV set, and inputted to a TV set through the above combination of the TV signal control and channel selection unit 109, TV signal processing unit 108 and main processing board 101, which offers a set-top box function, within the host device 1 if the TV set is an analog TV set.

With comparison with the host device as shown in FIG. 6, the host device as shown in FIG. 7 further includes the TV signal processing unit 108 and the TV signal control and channel selection unit 109. The TV signal processing unit 108 and the TV signal control and channel selection unit 109 may be also added to the host device as shown in FIG. 4 or 5, with a connection relationship similar to that of FIG. 7. The host device in FIG. 4 or 5 incorporated with the TV signal processing unit 108 and the TV signal control and channel selection unit 109 is not show in the drawings.

Figure 8:
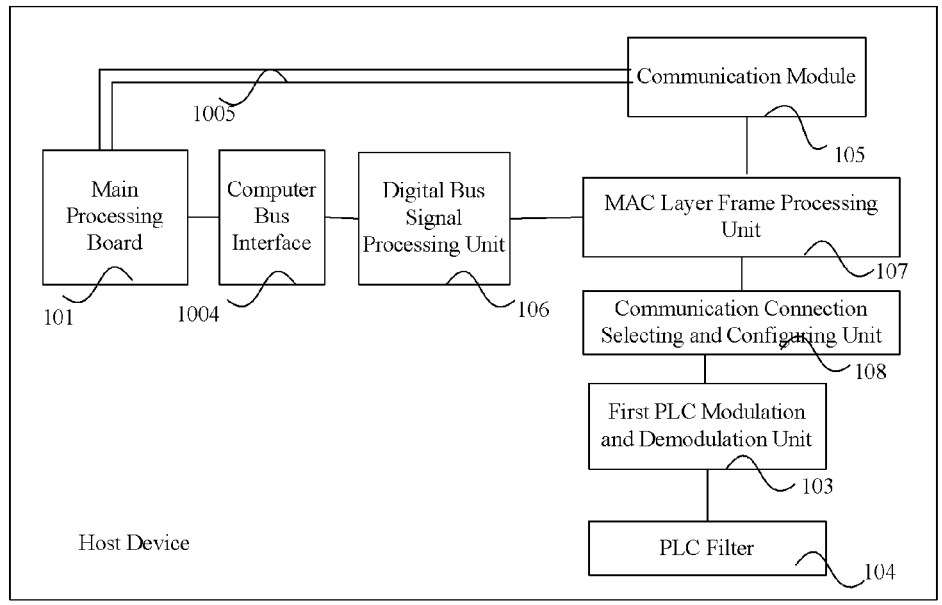
FIG. 8 is a schematic diagram showing a specific structure of a host device in a household gateway subsystem according to still another embodiment of the present invention.

FIG. 8 shows another illustrative structure of the host device 1, which includes:

a main processing board 101 provided with a CPU and configured to process information, generate control signals, authorize and authenticate, and allocate addresses to household appliance devices;

a digital bus signal processing unit 106, which is connected to the main processing board 101 via a computer bus interface and configured to analyze and process contents of digital bus signals, simulate information such as a change on a logical port and a level, associate a logical port with an address, and notify the main processing board 101 about such information; that is, digital bus signal processing unit 106 is the same as that shown in FIG. 5;

a MAC layer frame processing unit 107, which is connected to the digital bus signal processing unit 106 and is used to distinguish and separate a digital bus signal frame from an Ethernet frame;

a communication connection selecting and configuring unit 108, which is connected to the MAC layer frame processing unit 107 and is configured to select a wireline signal and a wireless signal for communicating;

a first power line carrier modulation and demodulation unit 103, which is connected to the communication connection selecting and configuring unit 108, and is adapted for conversion between power line carrier signals and digital bus signals, in order to transmit control signals;

a first power line carrier filter 104, which is connected to the first power line carrier modulation and demodulation unit 103, and is configured to filter and couple power signals, to output power and output power line carrier signals; and a communication module 105, which is connected to the main processing board 101 and the MAC layer frame processing unit 10 via a computer bus, and is adapted for protocol conversion, to communicate with an external communication network.

Figure 9:
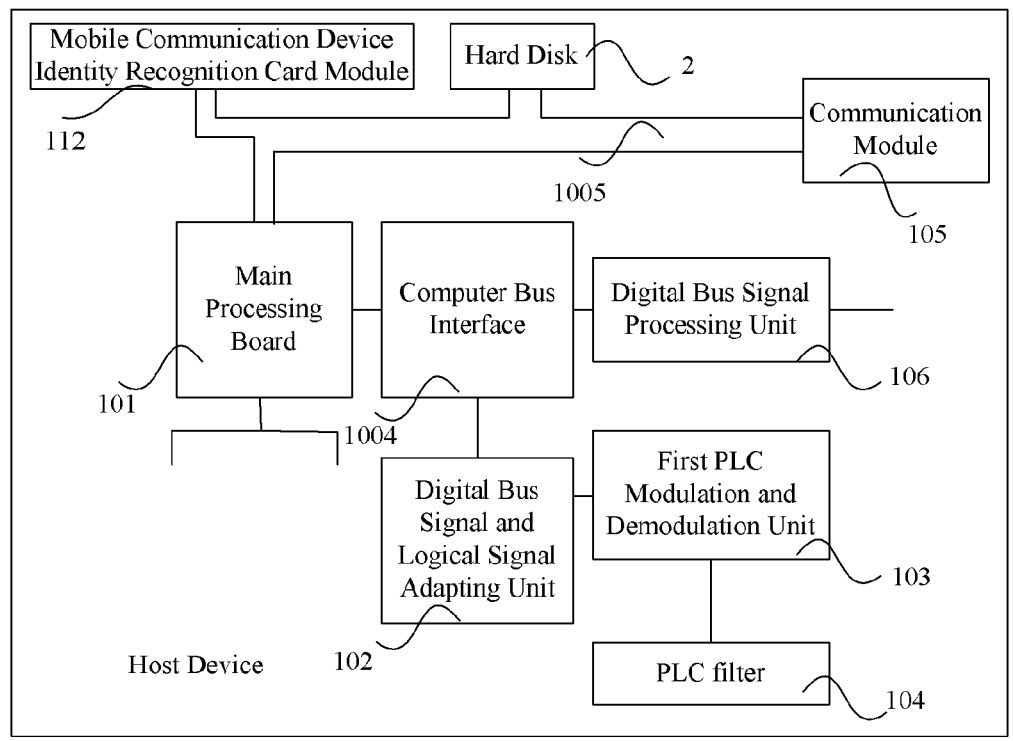
FIG. 9 is a schematic diagram showing a specific structure of a host device in a household gateway subsystem according to still another embodiment of the present invention.

A computer bus and logical signal adapting unit 102 may be further incorporated into the structure as shown in FIG. 8. The computer bus and logical signal adapting unit 102 may be connected to the main processing board 101 via a digital bus interface such as a wireless interface operating in a wireless USB mode, and exchange signals with the first power line carrier modulation and demodulation unit 103, in order for converting between the digital bus signals (for example, USB signals) and the logical signals, caching the converted USB signals and decoding signals. The computer bus and logical signal adapting unit 102 has a function of converting between digital bus signals and logical signals. Signals may be decoded by the computer bus and logical signal adapting unit 102 to control simple household appliance devices. Further, a tiny base station 109 may be incorporated into the structure as shown in FIG. 8, and the tiny base station 109 may be connected to the communication connection selecting and configuring unit and is configured to communicate with household appliances via wireless signals. The tiny base station 109 may be, for example, an AP for a WLAN network, a transceiver of wireless USB signals, or a transceiver in a wireless communication mode of infrared, Bluetooth and the like. Both of the computer bus and logical signal adapting unit 102 and tiny base station 109 may be incorporated into the structure as shown in FIG. 8. The host device as shown in FIG. 5 may further includes: a TV signal processing unit 108 connected to the main processing board 101; and a TV signal control and channel selection unit 109 connected to the main processing board 101 and the TV signal processing unit 108, and configured to receive TV signals, control the TV signals and select a channel. Reference may be made to FIG. 7 for details and detailed description thereof is omitted herein. The host device as shown in FIG. 9 further includes a mobile communication device identity recognition card module 112, which is connected to the main processing board 101 and the communication module 105 via a PCI bus, and is configured to provide the network side with information used for verifying identity of the host device. By incorporating the mobile communication device identity recognition card module into the host device, the network side may verify the host device, thereby providing services for the host device passing the verification.

The mobile communication device identity recognition card module 112 incorporated into the host device as shown in FIG. 9 may be also incorporated into any of the host devices described above, with the same connection relationship as that in FIG. 9, which is not shown in the drawings.

In the schematic diagrams of the structure of the host device as shown in FIGS. 5-9, the hard disk 2 is also connected to the main processing board via the PCI bus.

Figure 10:
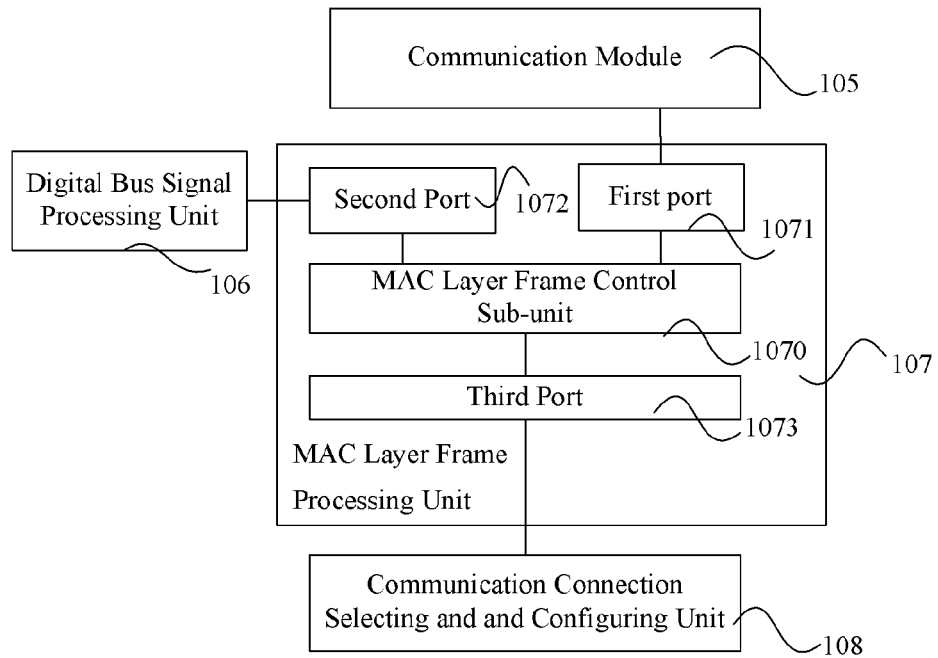
FIG. 10 is a schematic diagram showing a specific structure of an MAC layer frame processing unit of a host device in a household gateway subsystem according to an embodiment of the present invention.

FIG. 10 shows the internal structure of the above-described MAC layer frame processing unit 107, which includes: a MAC layer frame control sub-unit 1070, a first port 1071, a second port 1072 and a third port 1073. The third port 1073 is connected to the MAC layer frame control sub-unit 1070 and the communication connection selecting and configuring unit 108, and is configured to receive data packets from the communication connection selecting and configuring unit 108. After receiving data packets, the MAC layer frame control sub-unit 1070 analyzes the received data packets, determine whether the data packets are Ethernet frames or not by analyzing the header of the packets, and send the data packets to the respective ports. The data packet is sent to the first port 1071 if it is an Ethernet frame. The first port 1071 is connected to the MAC layer frame control sub-unit 1070 and the communication module 105, and is configured to forward Ethernet frames from the MAC layer frame control sub-unit to the communication module 105 for processing, and then the Ethernet frames are sent to the external network; or, the Ethernet frames may be processed in a reverse order. The data packets are sent to the second port 1072 if they are not Ethernet frames. The second port 1072 is connected to the MAC layer frame control sub-unit 1070 and the data bus signal processing unit 106, and is configured to send the non-Ethernet frames from the MAC layer frame control sub-unit 1070 to the data bus signal processing unit 106 for processing.

With the use of the MAC layer frame processing unit 107 with a structure having the above three ports, the Ethernet layer may be eliminated in the network internal to the household, thereby simplifying the protocol stack model; the corresponding function processing unit within the host device is further simplified; moreover, by packet analyzing and determining at a lower layer, a faster processing speed may be achieved, and the capability of dispatching packets may be improved. With the simplified layer structure, the address mapping between layers becomes simpler, and hence the addressing may be simplified.

Figure 11:
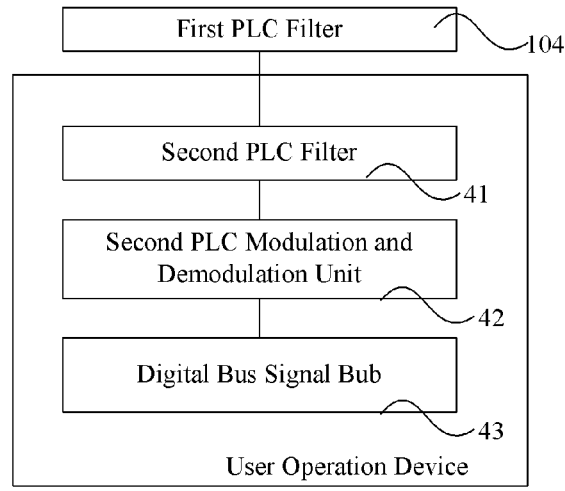
FIG. 11 is a schematic diagram showing a specific structure of a user operation device in a household gateway subsystem according to an embodiment of the present invention.

FIG. 11 shows a particular structure of the user operation device 4, which includes: a second PLC filter 41 connected to the first PLC filter of the host device 1 via power lines and configured to filter power signals to output power and PCL signals; a second power line carrier modulation and demodulation unit 42 connected to the second PLC filter 41 and configured for conversion between PCL signals and digital bus signals such as USB signals; a digital bus signal hub 43 connected to the second power line carrier modulation and demodulation unit 42 and configured to provide various USB interfaces, for receiving and controlling USB signals in a uniform way. The communication between the user operation device 4 and the host device 1 is based on the USB bus, such as the power line carriers carrying USB signals. The user operation device may also be configured to be based on a manner in which digital bus signals are carried in a wireless mode. That is, in addition to the second power line carrier modulation and demodulation unit 42 connected to the second power line carrier filter 41, the user operation device may be further provided with a wireless signal receiving and sending unit connected to a digital bus signal hub 43 and adapted to exchange signals with the host device. Such user operation device can be connected to the host device in a wireline mode or a wireless mode. Particularly, in a situation where an exception such as a power cut occurs, the user operation device may be switched automatically from the wireline connection mode to the wireless connection mode.

Figure 12:
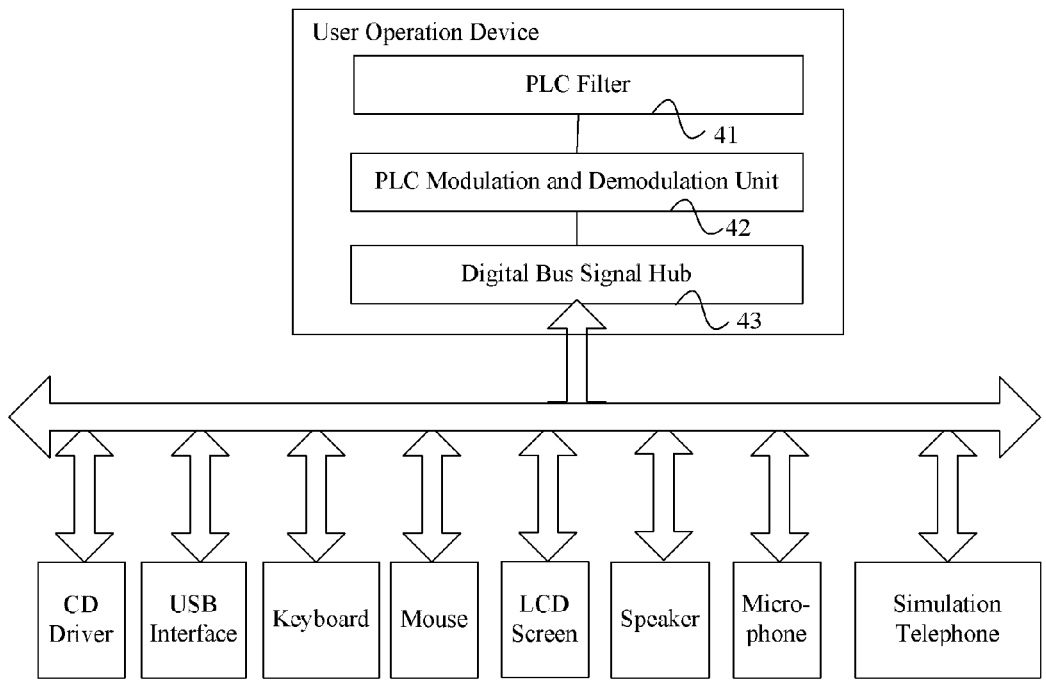
FIG. 12 is a schematic diagram showing a specific structure of a user operation device in a household gateway subsystem according to another embodiment of the present invention.

The user operation device 4 is separated from the host device 1, to facilitate the operation of various interfaces and function units by the user. The communication between the user operation device 4 and the host device 1 may be based on a digital bus, such as power line carriers carrying USB signals. The user operation device based on a digital bus may further provide various interfaces, as shown in FIG. 12 which illustrates another particular structure of the user operation device, and the various interfaces includes: a CD driver, a USB interface, a serial port, a parallel port, a computer keyboard, a mouse, a small LCD screen, a speaker, an earphone microphone socket and/or a simulation telephone constituted of a simulation hook switch, a simulation telephone handle and a simulation telephone keyboard. All of these devices may be based on USB interfaces.

The user operation device 4 may include various interfaces and function units to be operated by the user, which include: a CD driver, a USB interface, a serial port, a parallel port, a keyboard, a mouse, a small LCD screen, a speaker, an earphone microphone socket, a simulation telephone, and/or a simulation telephone constituted of a USB simulation hook switch, a USB simulation telephone handle and a USB simulation telephone keyboard.

To facilitate the user operation, the user operation device and the host device in the digital household gateway subsystem are separated from each other. The various interfaces and function units of the user operation device are connected to the main processing board of the host device via digital bus interfaces such as USB bus interfaces. Digital bus signals (such as USB bus signals) exchanged between the user operation device 4 and the main processing board 101 of the host device 1 are modulated to power lines by the second power line carrier modulation and demodulation unit 42 to be sent to the user operation device 4.

In the household gateway subsystem of FIGS. 1-12, the host device provides the digital household with general computing resources and a communication gateway center function. For a network external to the household, the host device is a network access point of the digital household; and for all the information household appliances within the household, the host device is a main control computer, which means that all information household appliances within the household are peripheral devices of the host device that are based on a digital bus such as a USB bus or a 1394 bus. For the household gateway subsystem, all devices other than the TV set (which may be used as a display of the host device), including the user operation device and the remote controller, are peripheral devices of the host device that are based on a digital bus such as a USB bus. Therefore, by separating the household network from the communication network external to the household (such as an IP access network), all information household appliances within the household or wireless household appliance devices that may receive wireless signals are invisible to the external network, and the household gateway subsystem ensures the security within the household.

A modularized structure is employed by the household gateway subsystem according to an embodiment of the invention, and various devices constituting the subsystem may be arranged in a distributed manner, and include a hose device, a TV set, a user operation device and one or more remote controller.

Figure 13:
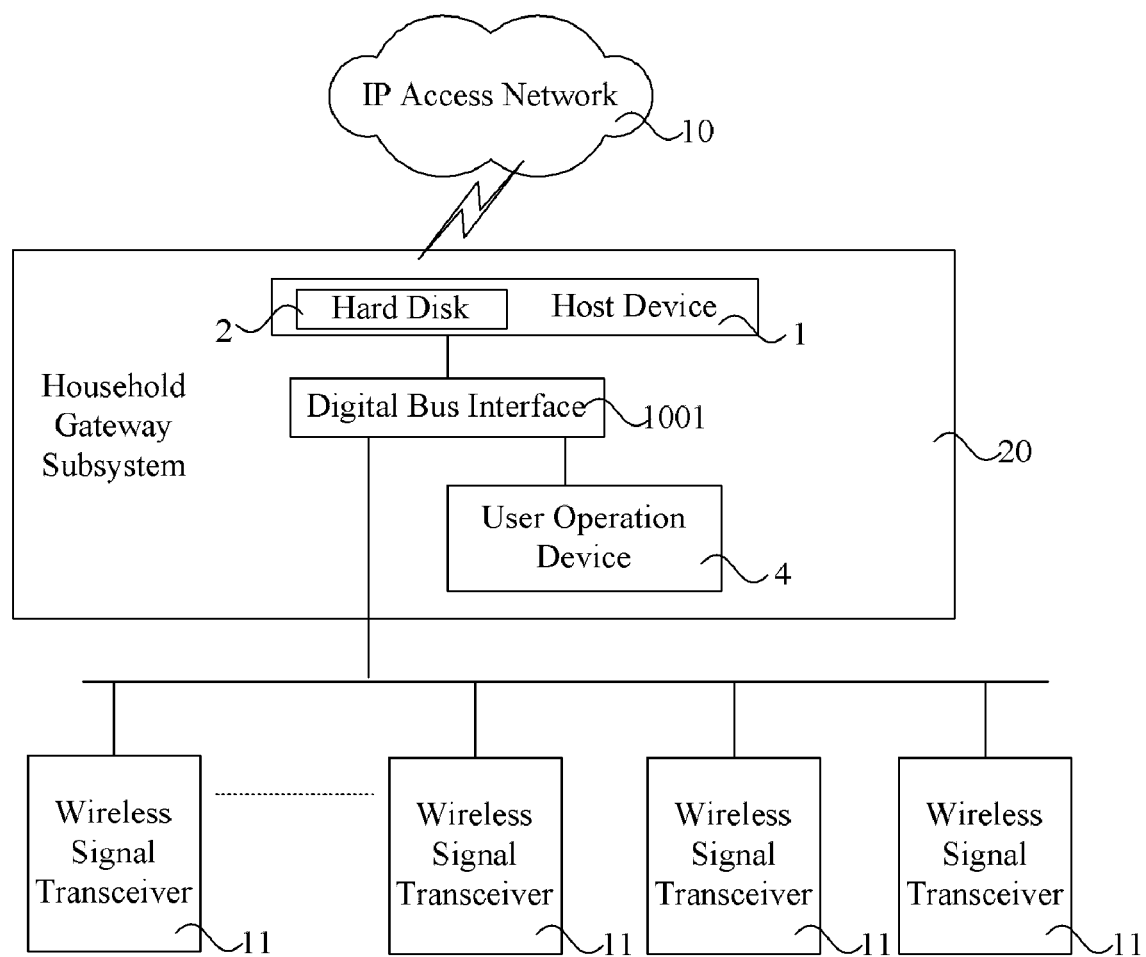
FIG. 13 is a schematic diagram showing the structure of a first example of a digital household system according to an embodiment of the present invention.

FIG. 13 shows a schematic diagram of the structure of a first example of the digital household system according to an embodiment of the invention, and the digital household system 100 is constituted of a household gateway subsystem 20 and a plurality of wireless signal transceivers 11. The household gateway subsystem 20 is connected to the external communication network via an IP access network 10 to provide various control signals, and includes: a host device 1 provided with a storage medium such as a hard disk 2 and configured to connect the external network to household devices and control the household devices based on a digital bus mode such as a USB bus mode; a user operation device 4, which communicates with the host device via the digital bus mode and provides various user operation interfaces and control units, where the digital bus mode is that USB signals are carried over power line carriers or a wireless interface; a plurality of wireless signal transceivers 11, which are connected to the host device 1 of the household gateway subsystem, and is configured to receive and send power line carrier signals and wireless signals and perform conversion between the power line carrier signals and wireless signals. In the household gateway subsystem as shown in FIG. 12, signals are transmitted using power line carriers, and such household gateway subsystem may operate once being connected to a power socket via a power interface. If an exception occurs to the power socket (for example, the power socket is loosed) and then power is cut, the household gateway subsystem may use its own backup power supply. That is, the host device 1 is provided with a first battery and power supply module 3, the user operation device 4 is provided with a second battery and power supply module 5, and the household gateway subsystem may be always in a powered on state with the use of these two backup power supply modules, and an exception may be avoided.

Figure 14:
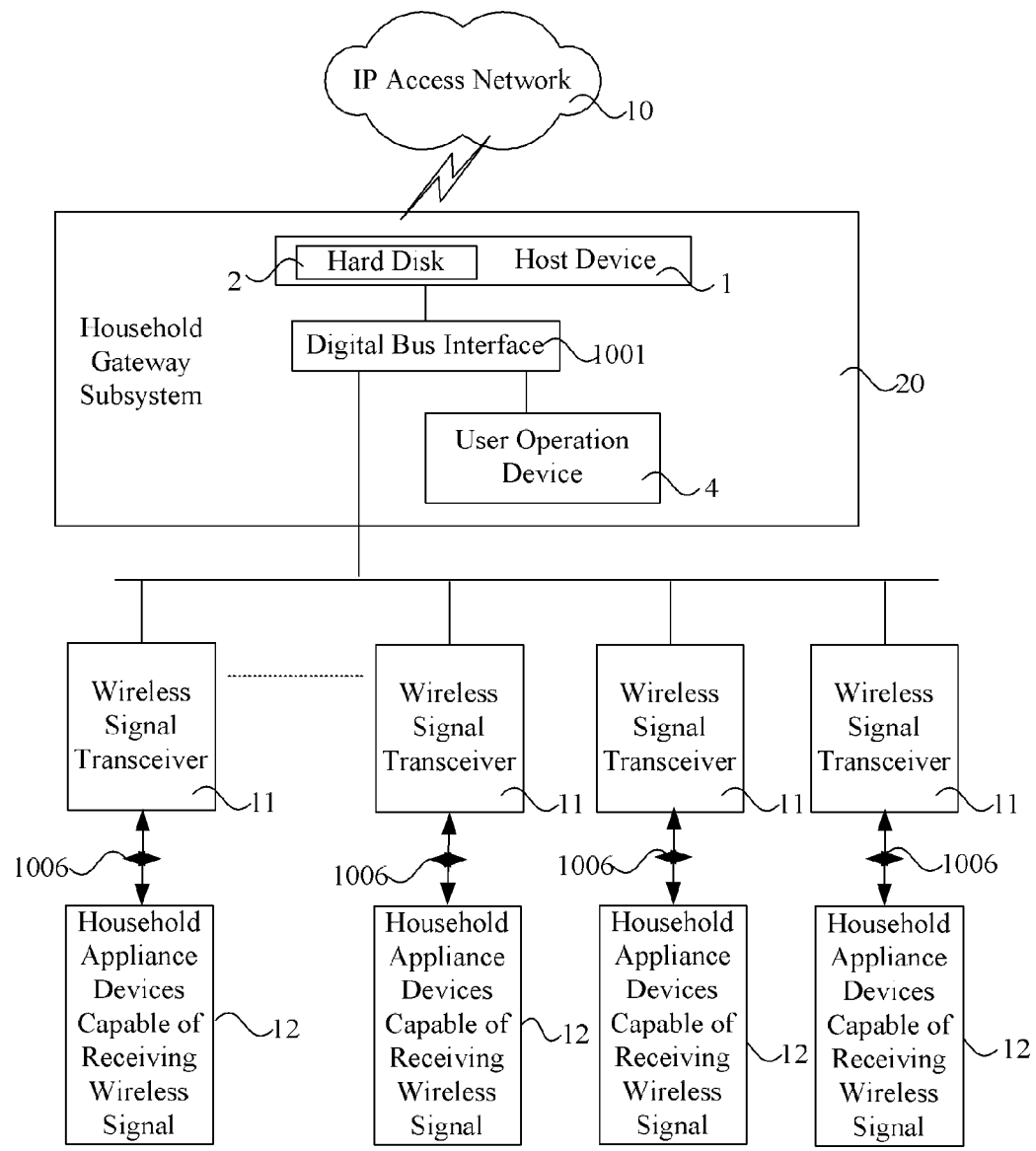
FIG. 14 is a schematic diagram showing the structure of a second example of a digital household system according to an embodiment of the present invention.
Figure 15:
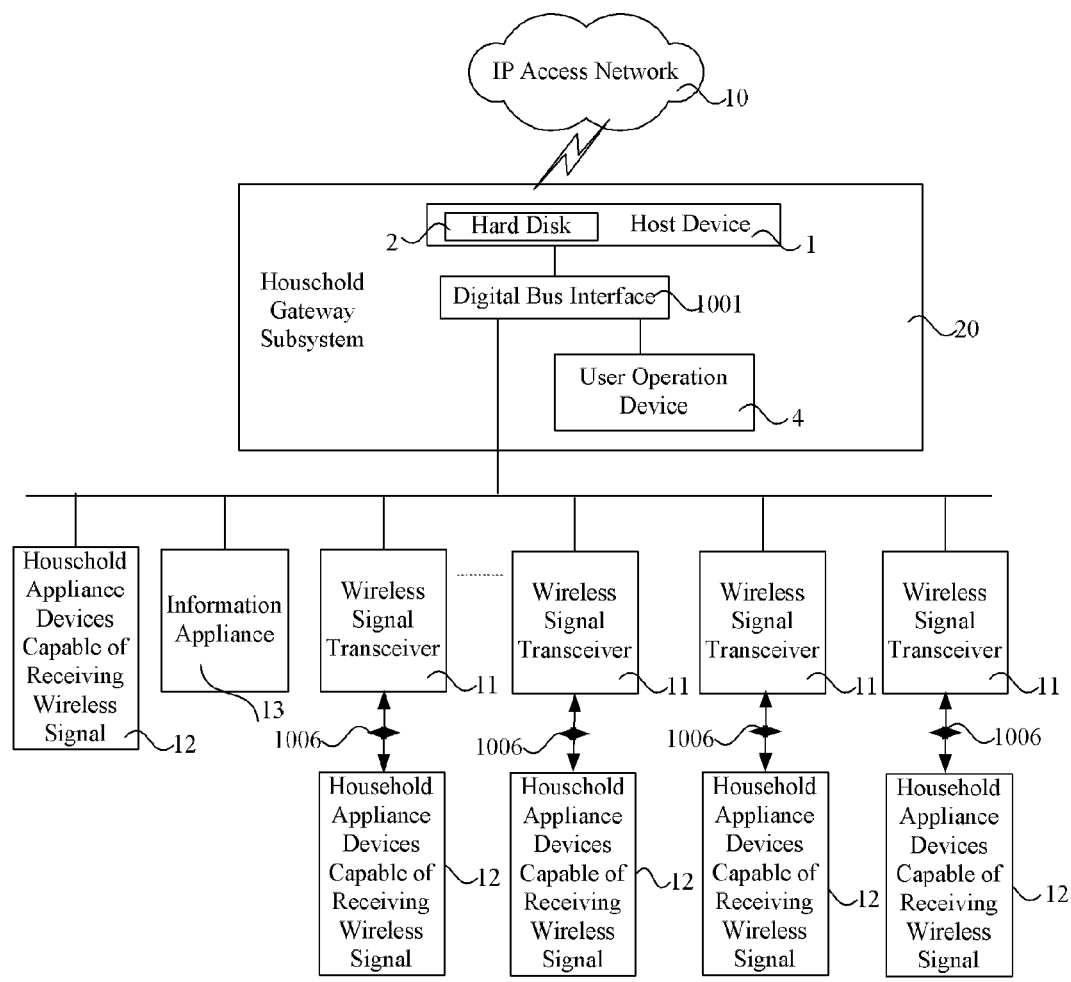
FIG. 15 is a schematic diagram showing the structure of a third example of a digital household system according to an embodiment of the present invention.
Figure 16:
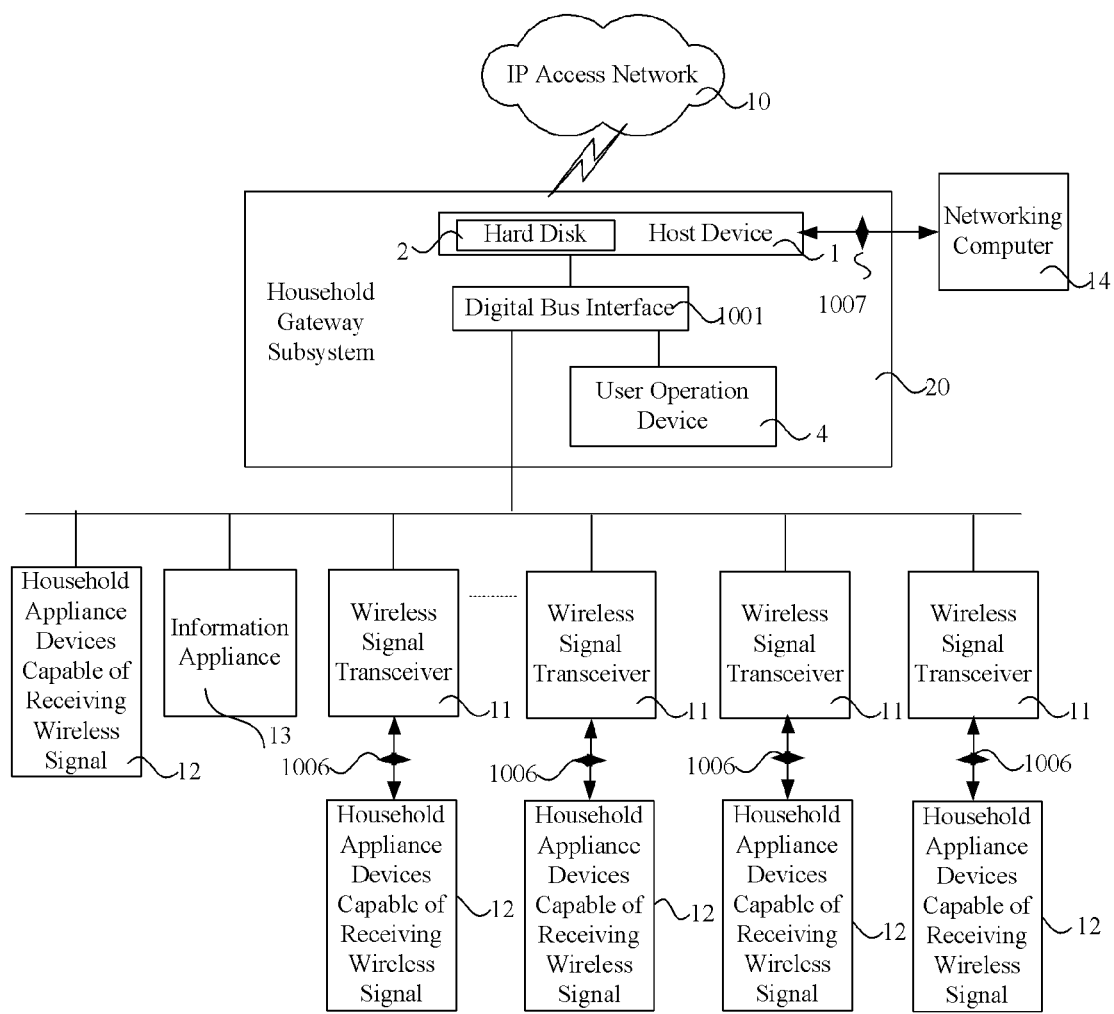
FIG. 16 is a schematic diagram showing the structure of a fourth example of a digital household system according to an embodiment of the present invention.
Figure 17:
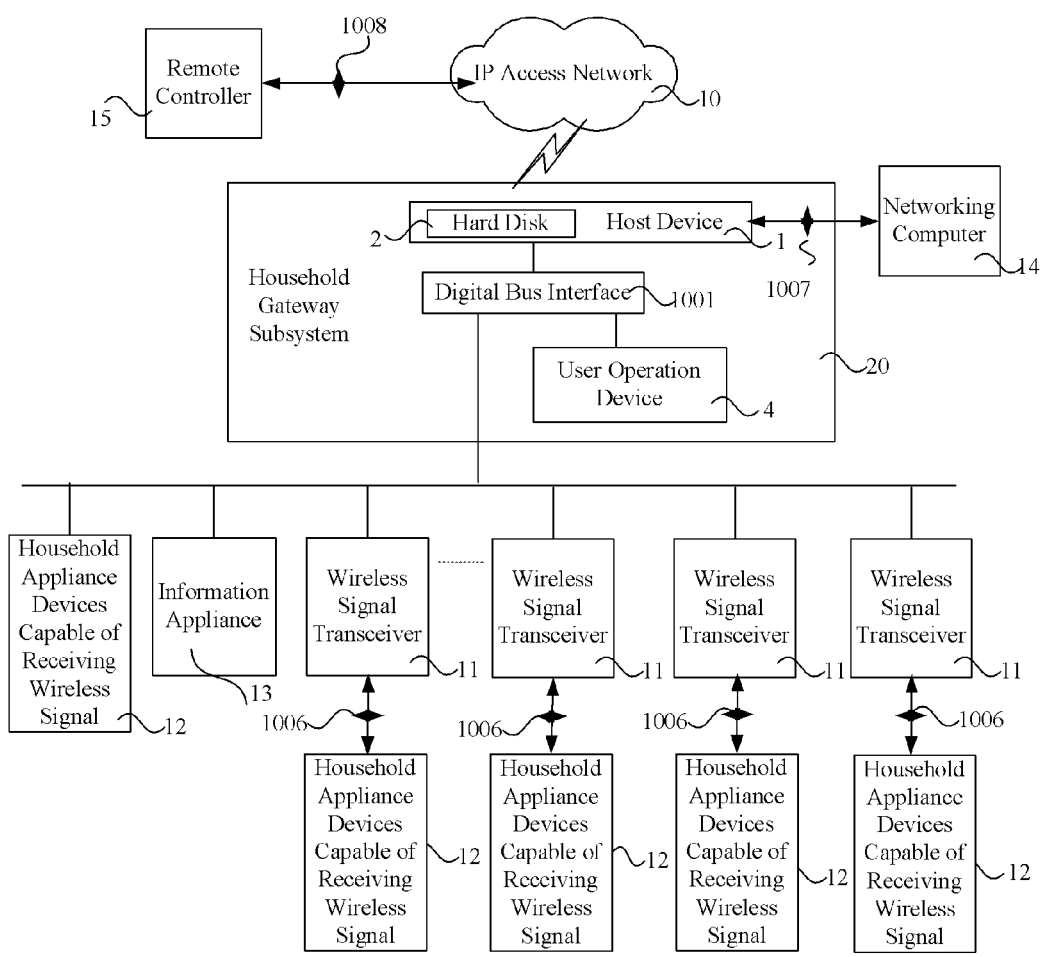
FIG. 17 is a schematic diagram showing the structure of a fifth example of a digital household system according to an embodiment of the present invention.

FIG. 14 shows a second example of the digital household system according to an embodiment of the invention, in the digital household system 100, a plurality of household appliance devices 12 that may receive wireless signals are connected to the wireless signal transceivers 11 via wireless signal interfaces 1006 such as USB interfaces. FIG. 15 shows a third example of the digital household system according to an embodiment of the invention, and the digital household system may further include an information appliance 13, which is configured to exchange digital bus signals with the host device via power lines; or, the digital household system may include a plurality of household appliance devices 12 capable of receiving wireless signals and directly connected to the host device via data bus interfaces, here, the data bus interfaces are interfaces provided by a micro base unit of the host device and may be a wireless USB transceiver. FIG. 16 shows a fourth example of the digital household system according to an embodiment of the invention, and the digital household system may further include a networking computer 14, which is connected to the host device 1 via a computer online interface 1007. In comparison with the third example of the digital household system, the fourth example of the digital household system is further provided with the online computer 14, which may be also incorporated into the first and second examples of the digital household system, and the connection relationships thereof are the same as that of the fourth example, and detailed description thereof is omitted herein. FIG. 17 shows a fifth example of the digital household system according to an embodiment of the invention, and the digital household system may include a remote controller 15, which is connected to the IP access network via a mobile IP 1008, and is configured to control remotely various household appliance devices through the IP access network and the host device.

A household appliance device capable of receiving a wireless signal has a wireless signal processing unit configured to receive wireless control signals. After such household appliance device capable of receiving the wireless signal receives a wireless control signal, a core processing unit of the household appliance device controls the household appliance device according to the wireless control signal. The household appliance device may be, for example, a wireless air conditioner, a refrigerator, a microwave oven and a water heater.

Herein, the information household appliances generally refer to household appliances capable of receiving wireless signals, not including a household appliance employing a wireline communication mode such as a TV set directly connected to a CABLE and a lamp switch connected to the power line.

The household appliance capable of receiving a wireless signal may also employ a power line carrier signal for transmitting if it has no wireless function.

The household gateway subsystem in the digital household system has a structure as shown in any one of FIGS. 1-12, and detailed description thereof is omitted herein. With the digital household system, a user sends control information to the host device via a wireless interface by using a remote controller of the household gateway subsystem, and the host device converts the wireless control signal into a power line carrier signal to control the corresponding information household appliance. The digital household system may include various household appliance devices capable of receiving wireless signals, which send wireless signals to the host device via wireless signal transceivers installed in a room, a garage or a courtyard, and receive wireless signals from the wireless signal processing unit of the host device via the wireless signal transceivers, so that the household appliance devices may be under control; the control signals may be sent directly by the remote controller to the mother board processor of the host device, and the mother board processor may analyze and identify the received control signals and sends the control signals processed by the wireless signal processing unit to the household appliance devices to control the same. Alternatively, the user may control the household appliances in the digital household system through a mobile communication device such as a mobile phone, and the control signal from the user may be sent to the appliances within the household through the main processing board and its wireless signal processing unit, the first power line carrier modulation and demodulation unit and the power line carrier filter. In the digital household system, when the host device accesses a network server, the network server identifies the mobile communication device identifying module, in which identifier information used to verity whether the host device may be authorized to access is stored.

Further, in the digital household system, the TV set may be used as a nontraditional TV set to play CATV programs, or, the TV set may be used as a display device in the household gateway subsystem. For example, with the use of the TV set as a display of the host device, together with the keyboard, mouse, CD driver, speaker and so on provided for the user operation device, a separated computer is obtained, thereby facilitating user operation. The user operation device may be, for example, arranged near a sofa. The keyboard and mouse of the user operation device may be operated by the user and the TV set arranged opposite to the sofa may be used as a display device of the host device, so that the user sitting in the sofa may easily control the gateway system through the keyboard and mouse, without taking the wiring into consideration. In contrast, it is difficult to deploy the wiring of the keyboard, mouse and display in the prior art, due to the limits of distance and other devices in the household.

In the digital household system according to embodiments of the invention, the TV signal processing function provided collectively by the TV signal control and channel selection unit, the TV signal processing unit and the main processing board is similar to the function of the set-top box, so that TV programs may be received by the host device in the household gateway subsystem.

In the digital household system according to embodiments of the invention, the user may connect a computer to the network port of the household gateway subsystem to access the Internet via the computer.

In the networking of the digital household system according to embodiments of the invention, the use of the Ethernet structure is eliminated and the most simple networking mode is used, in which the most commonly used power lines in the household are used as the primary carrying lines, digital bus signals such as USB signals are modulated onto the power lines directly; wireless signal transceivers are arranged in rooms, garages and courtyards, so that nearby devices may communicate with each other via wireless signals directly; and the communication range of the wireless signal is enlarged by connecting power lines and wireless signal transceivers.

In the invention, the digital bus may be a USB bus, a 1394 bus and the like.

It will be appreciated that the embodiments of the invention described above are merely intended to illustrate the solutions in the invention, instead of limiting the invention. While the invention has been described in detail in combination of the preferable embodiments, it will be appreciated by those skilled in the art that various modifications and alterations may be made to the solutions of the invention without departing from the scope of the invention.

The invention claimed is:

1. A household gateway subsystem, comprising:
a host device, configured to connect an external network to a household network, and control various information household appliances within the household based on a digital bus mode; and
a user operation device, configured to communicate with the host device via a digital bus interface and provided with various interfaces and control units;
wherein the host device comprises:
a Media Access Control, MAC, layer frame processing unit configured to distinguish and separate a digital bus signal frame from an Ethernet frame;
a communication module, which is connected to the MAC layer frame processing unit via a computer bus, and is configured for protocol conversion of information, to communicate with the external network;
a main processing board, which is provided with a Central Processing Unit, CPU, and is configured for information processing, control signal generating, and authenticating and authorizing to allocate addresses to the information household appliances;
a computer bus and logical signal adaptation unit, which is connected to the main processing board and a first power line carrier modulation and demodulation unit, and is configured for conversion between a logical signal and a digital bus signal, caching the digital bus signal after the conversion, and decoding signals;
a first power line carrier modulation and demodulation unit, which is connected to the computer bus and logical signal adaptation unit, and is configured for conversion between a power line carrier signal and the logical signal and transmitting a control signal;
a first power line carrier filter, which is connected to the first power line carrier modulation and demodulation unit, and is configured for filtering and coupling a power signal to output power and a power line carrier signal; and
a communication module, which is connected to the main processing board and the MAC layer frame processing unit via a computer bus, and is configured for protocol conversion of information, to communicate with the external network.

2. The household gateway subsystem of claim 1, wherein the host device further comprises:
a mobile communication device identity recognition card module, which is connected to the main processing board and the communication module via a Peripheral Component Interconnect, PCI, bus, and is configured to verify identity of the host device.

3. The household gateway subsystem of claim 1, wherein the user operation device comprises:
a second power line carrier filter connected to the host device and configured to filter power signals to output power and power line carrier signals;
a second power line carrier modulation and demodulation unit connected to the second power line carrier filter and configured for conversion between power line carrier signals and digital bus signals; and
a digital bus signal hub connected to the second power line carrier modulation and demodulation unit and configured to provide digital bus interfaces, for receiving and controlling Universal Serial Bus, USB, signals in a uniform way.

4. A household gateway subsystem, comprising:
a host device, configured to connect an external network to a household network, and control various information household appliances within the household based on a digital bus mode; and
a user operation device, configured to communicate with the host device via a digital bus interface and provided with various interfaces and control units;
wherein the host device comprises:
a Media Access Control, MAC, layer frame processing unit configured to distinguish and separate a digital bus signal frame from an Ethernet frame;
a main processing board, which is provided with a Central Processing Unit, CPU, and is configured for information processing, control signal generating, and authenticating and authorizing to allocate addresses to the information household appliances;
a digital bus signal processing unit, which is connected to the main processing board via a computer bus interface and to the MAC layer frame processing unit, and is configured to analyze and process contents of digital bus signals, simulate information of a change on a logical port and a level, associate a logical port with the address, and notify the main processing board about the information;
a communication connection selection and configuration unit, which is connected to the MAC layer frame processing unit, and is configured to select adaptively a communication link for one of the information household appliances;
a first power line carrier modulation and demodulation unit, which is connected to the communication connection selection and configuration unit, and is configured for conversion between a power line carrier signal and a logical signal and transmitting a control signal;
a first power line carrier filter, which is connected to the first power line carrier modulation and demodulation unit, and is configured for filtering and coupling a power signal to output power and a power line carrier signal; and
a communication module, which is connected to the main processing board and the MAC layer frame processing unit via a computer bus, and is configured for protocol conversion of information, to communicate with the external network.

5. The household gateway subsystem of claim 4, wherein the host device further comprises:
a tiny base station unit connected to the communication connection selection and configuration unit and configured to communicate via wireless signals.

6. The household gateway subsystem of claim 4, wherein the host device further comprises:
a computer bus and logical signal adaptation unit, which is connected to the main processing board and the first power line carrier modulation and demodulation unit, and is configured for conversion between a logical signal and a digital bus signal, caching the digital bus signal after the conversion, and decoding signals.

7. A digital household system, comprising:
a household gateway subsystem, which is connected to an external network via an Internet Protocol, IP, access network, and is configured to provide various control signals, wherein the household gateway subsystem comprises a host device configured to connect the external network to information household appliances and control the information household appliances based on a digital bus mode, and a user operation device communicating with the host device via a digital bus interface and providing various user operation interfaces and control units; and
a plurality of wireless signal transceivers, which are connected to the host device of the household gateway subsystem, and are configured to receive power line carrier signals from the host device, convert the power line carrier signals into wireless signals and send the wireless signals to the information household appliances; or, receive wireless signals from the information household appliances, convert the wireless signals into power line carrier signals and send the power line carrier signals to the host device;
wherein the host device comprises:
a Media Access Control, MAC, layer frame processing unit, which is configured to distinguish and separate a digital bus signal frame from an Ethernet frame;
a main processing board, which is provided with a Central Processing Unit, CPU, and is configured for information processing, control signal generating, and authenticating and authorizing to allocate addresses to the information household appliances;
a computer bus and logical signal adaptation unit, which is connected to the main processing board and a first power line carrier modulation and demodulation unit, and is configured for conversion between a logical signal and a digital bus signal, caching the digital bus signal after the conversion, and decoding signals;
a first power line carrier modulation and demodulation unit, which is connected to the computer bus and logical signal adaptation unit, and is configured for conversion between a power line carrier signal and a logical signal and transmitting a control signal;
a first power line carrier filter, which is connected to the first power line carrier modulation and demodulation unit, and is configured for filtering and coupling a power signal to output power and a power line carrier signal; and
a communication module, which is connected to the main processing board and the MAC layer frame processing unit via a computer bus, and is configured for protocol conversion of information, to communicate with the external network;

or the host device comprises:

a MAC layer frame processing unit, which is configured to distinguish and separate a digital bus signal frame from an Ethernet frame;

a main processing board, which is provided with a CPU and is configured for information processing, control signal generating, and authenticating and authorizing to allocate addresses to the information household appliances;

a digital bus signal processing unit, which is connected to the main processing board via a computer bus interface and to the MAC layer frame processing unit, and is configured to analyze and process contents of digital bus signals, simulate information of a change on a logical port and a level, associate a logical port with the address, and notify the main processing board about the information;

a communication connection selection and configuration unit, which is connected to the MAC layer frame processing unit, and is configured to select adaptively a communication link for one of the household information appliances;

a first power line carrier modulation and demodulation unit, which is connected to the communication connection selection and configuration unit, and is configured for conversion between a power line carrier signal and a logical signal and transmitting a control signal;

a first power line carrier filter, which is connected to the first power line carrier modulation and demodulation unit, and is configured for filtering and coupling a power signal to output power and a power line carrier signal; and a communication module, which is connected to the main processing board and the MAC layer frame processing unit via a computer bus, and is configured for protocol conversion of information, to communicate with the external network.

8. The digital household system of claim 7, further comprising:

a plurality of household information appliances capable of receiving the wireless signals, which are connected to the wireless signal transceivers via wireless signal interfaces, and exchange digital bus signals with the host device via power lines.

9. The digital household system of claim 7, wherein when the host device comprises the MAC layer frame processing unit, the main processing board, the digital bus signal processing unit, the communication connection selection and configuration unit, the first power line carrier modulation and demodulation unit, the first power line carrier filter and the communication module, the host device further comprises:

a tiny base station unit connected to the communication connection selection and configuration unit and configured to communicate via wireless signals.

10. The digital household system of claim 7, wherein when the host device comprises the MAC layer frame processing unit, the main processing board, the digital bus signal processing unit, the communication connection selection and configuration unit, the first power line carrier modulation and demodulation unit, the first power line carrier filter and the communication module, the host device further comprises:

a computer bus and logical signal adaptation unit, which is connected to the main processing board and the first power line carrier modulation and demodulation unit, and is configured for conversion between a logical signal and a digital bus signal, caching the digital bus signal after the conversion, and decoding the signals.

11. The digital household system of claim 7, wherein the host device further comprises:

a mobile communication device identity recognition card module, which is connected to the main processing board and the communication module via a Peripheral Component Interconnect, PCI, bus, and is configured to verify identity of the host device.

12. The digital household system of claim 7, wherein the user operation device comprises:

a second power line carrier filter connected to the host device and configured to filter power signals to output power and power line carrier signals;

a second power line carrier modulation and demodulation unit connected to the second power line carrier filter and configured for conversion between power line carrier signals and digital bus signals; and a digital bus signal hub connected to the second power line carrier modulation and demodulation unit and configured to provide digital bus interfaces, for receiving and controlling Universal Serial Bus, USB, signals in a uniform way.

* * * * *